United States Patent Office 3,162,871
Patented Dec. 29, 1964

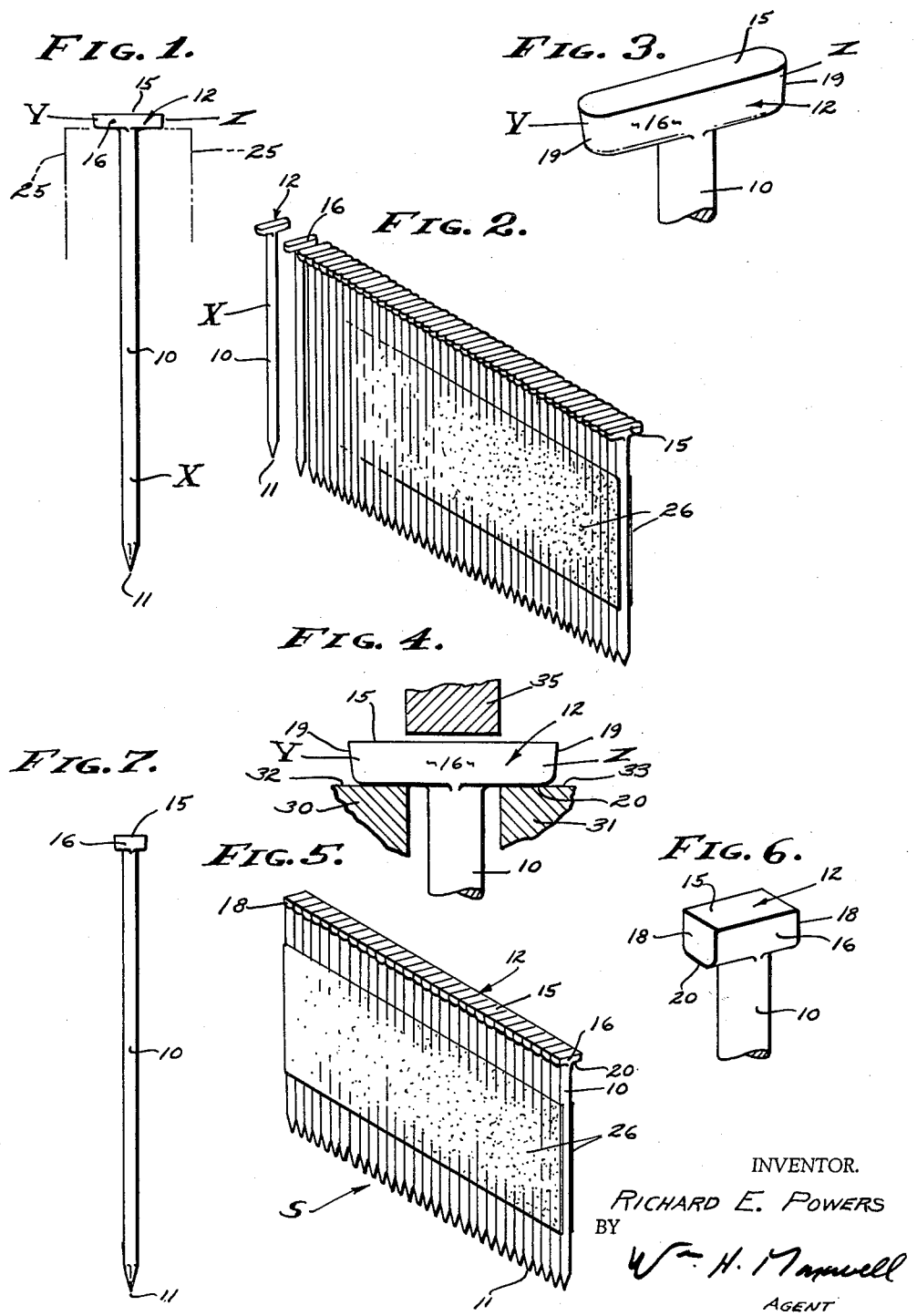

3,162,871
METHOD OF MAKING A STICK OF T-HEADED
FINISH NAILS
Richard E. Powers, Monterey Park, Calif., assignor to
Powers Wire Products Company, Inc., Los Angeles,
Calif., a corporation of California
Filed Aug. 15, 1960, Ser. No. 49,551
3 Claims. (Cl. 10—54)

This invention has to do with finished-nails and an improved method of making the same, and the invention is particularly concerned with fasteners in the form of "finish-nails" and which are supplied in "sticks" for use in mechanical drive tools, it being a general object of this invention to provide the article in the form of a finish-nail and a feasible method of producing the same on a commercially practical basis.

This application is co-pending with application Serial No. 161,965, filed December 26, 1961, entitled Stick of Finish-Nails.

The fastener driving art is well developed in connection with tools for driving fasteners and such tools are characteristically pneumatically operated to drive the fasteners one at a time as they are received from a magazine supply. Although there are nailing machines which, for example, sort individual nails from a storage bin type of supply (also riveting machines, etc.) and properly face them and drive them one at a time, it has been more practical to supply a multiplicity of fasteners in the so-called "stick" form and to sever one fastener at a time from said stick to simultaneously drive it. This is particularly true with U-shaped staple fasteners and also with a multitude of odd-shaped fasteners. In order to produce a stick of fasteners, the said fasteners are simply aligned parallel and adjacent to each other and they are adhered together in this relationship, thereby forming said stick. In practice, an adhesive body is applied and which glues or cements the multiplicity of like or identical fasteners into said stick formation.

The ordinary finish-nail that is so common to the carpentry trade is characterized by its elongate shank, sharpened at one end, and having a slightly enlarged rounded head at the other end. This particular finish-nail fastener is adapted to be set, by driving it below the top surface plane through which it penetrates, and it is round in configuration throughout its entire length, excepting its point. Now, it has been practically impossible to orient said ordinary finish-nails relative to each other in order to establish a stick for use in a driving tool having a magazine for the reception of said stick. The difficulty arises in the formation of a stick that is sufficiently straight, this problem being due primarily to the roundness of the articles to be joined and with the inherency of them to lie tangentially in any direction relative to each other. It is this latter inherency and tendency to lie in any direction laterally that results in sticks that are not true and straight.

A difficulty that has arisen in the handling of fasteners is the inadequate provision of geometrical features on the fastener body which would permit handling and orientation thereof. In the case of an ordinary finish-nail with a slightly enlarged and round head it is practically impossible to grip said nail in the first instance and secondly there is no lateral reference on said nail to which another like nail can be related. That is, firstly difficulty arises in the provision of machinery to engage and handle the said nail, and secondly, once they are engaged by the machinery the difficulty arises in the relating or engagement of one nail relative to the other according to a predetermined geometrical plan. In other words, slightly enlarged round heads are inadequate and impractical, and with the result that straight and true sticks cannot be formed thereof.

An object of this invention is to provide sticks of finish-nails that are straight. With the head configuration here-in disclosed there is positive and predetermined reference engagement between adjacent individual finish-nails, whereby accuracy of stick formation is made practical.

Another object of this invention is to provide a method of making finish-nails in stick formation, said sticks being straight and said individual nails being characterized by slightly enlarged heads. The method involves the initial formation of individual nail bodies, each with an enlarged head adapted to facilitate orientation into a straight stick formation, and the method also involves the removal of portions of the initial body formation, with the final result that the finished article has the usual slightly enlarged head.

The various objects and features of this invention will be fully understood from the following detailed description of the typical preferred form and application thereof, throughout which description reference is made to the accompanying drawings, in which:

FIG. 1 is an elevation of the nail body that is initially formed in carrying out the method of the present invention. FIG. 2 is a perspective view showing the method steps of orienting one nail body, as shown in FIG. 1, to the other and the securement of said nail bodies into stick form. FIG. 3 is an enlarged perspective view of the head portion of the initially formed nail body. FIG. 4 is an enlarged detailed sectional view showing the method step of removing portions of the head that is initially formed. FIG. 5 is a perspective view similar to FIG. 2 and illustrates the finished stick formation, after removal of the head portions. FIG. 6 is an enlarged perspective view similar to FIG. 3 and shows the finished formation of the head portion of the finish-nail, and FIG. 7 is a view similar to FIG. 1 and shows the final form of the finish-nail.

The method involved is illustrated throughout the figures of the drawings, beginning with the initial body formation shown in FIG. 1 and ending with the finished article formation shown in FIG. 7. The said finished article is of the usual finish-nail formation having a straight elongate cylindrical shank 10 that is of round cross section and pointed at 11 at its lower terminal end. The head portion 12 is at the upper end of the nail, said head portion 12 being slightly larger in transverse cross section than the shank 10. There is a difference, however, in head configuration as compared with an ordinary round headed finish-nail, the head of the instant nail being essentially polygonal in top plan view. As shown, the head portion 12 has a flat top 15 in a plane normal to the body axis, and it has straight and spaced parallel sides 16 in planes that are tangent to diametrical opposite points on the periphery of said shank 10.

The finished head portion is slightly elongate, so as to be of slightly larger configuration than the shank 10, and it is characterized by straight spaced and parallel ends 18 in planes offset and beyond the diameter of the periphery of said shank 10. In practice, the head portion projects laterally a distance equal to about one-half the diameter of the shank. In other words, the head portion 12 is other than square and is elongated so as to extend equally beyond the shank 10 at opposite sides of the nail body. The bottom 20 of the head portion 12 is convexly curved and extends transversely and normal to the sides 16 and top 15.

In accordance with the present invention, I initially form the nail body as it is shown in FIGS. 1 and 3 of the drawing, said initial formation being characterized by a substantially elongated head portion as distinguished from the slightly elongated configuration of the finished article above described. In the preferred form, this initial formation comprises a head portion elongated to approximately three times the diameter of the shank 10, or more. Thus, the head 12 is extended at Y and Z, the configuration of the elongated head portion being generally the same as that of the finished head portion, but having continuations of the above mentioned top, bottom, and sides. The end configuration of the initially formed head portion is unimportant except that it be uniform for symmetry and resultant accuracy of handling. In any case, the initially formed nail body X is characterized by the substantially elongate head portion 12 with extended ends Y and Z having rounded ends 19 and flat parallel sides 16 spaced apart a distance equal to the diameter of the shank, and presenting a symmetrical T formation.

In accordance with the method a plurality of initially formed nail bodies X of T formation are mechanically arranged and placed in a guide, one after the other, so that their shanks 10 engage tangentially and so that the side 16 of one head portion 12 engages the side 16 of the next adjacent head portion 12. This step of the method is indicated at the left of FIG. 2 of the drawings and it will be apparent that suitable guide rails 25 are readily provided to accurately direct the shanks 10 while being supported by the extended ends Y and Z (see FIG. 1). The plurality of nail bodies X thus supported adjacent each other, with the elongate head portions 12 extending transversely of the supporting rails, are then advanced along said rails and secured together.

The preferred means of joinder of the individual nail bodies X is to apply an adhesive material 26 thereto, at opposite sides, and which material is rapid drying. The continuity of adjacent nail bodies X is broken, as circumstances require, by severing the adhered nail bodies at suitable intervals thereby producing a stick S having a predetermined number of said bodies X. The rails 25 initially hold the nail bodies X in alignment, after which the elongated transverse head portions 12 engage with each other to retain the initially established alignment. With the adhered nail bodies X in stick formation as above described, and held straight by virtue of said transverse engagement of adjacently related head portions 12 with their extensions Y and Z, the said stick can now be handled and manipulated without danger of misalignment. Therefore, and in accordance with the invention, the extensions Y and Z are now removed in order to reduce the head configuration to the above described limited configuration that is only slightly larger than that of the cross section of the shank 10. This is the last step of the method and involves removal of the extensions Y and Z, leaving the ends 18 as above described. It is preferred that said extensions be removed by a shearing action such as is shown in FIG. 4 wherein there are supporting die parts 30 and 31 with upwardly faced shoulders 32 and 33 to engage the initially formed head portions to support the nail bodies X, the shanks 10 being centered by the inner opposed faces of the die parts 30 and 31, and wherein a punch 35 is advanced to simultaneously sever the extensions X and Y from the head portions in the planes of and forming the ends 18.

The finished article is shown in FIGS. 5, 6 and 7, the finished stick being shown in FIG. 5 with the head portions 12 of reduced dimensions. In FIG. 7 the single finish-nail is shown as it appears alone and removed from the stick, it being understood that this process of severance occurs in the shearing and driving action that takes place in the fastener driving tool to be used in connection with the stick S of finish-nails herein provided.

From the foregoing it will be apparent that the elongated head configuration with flat sides that are parallel and tangent to diametrically opposite peripheral points on the shank act to engage adjacent with each other to align a multiplicity of nail bodies X and to retain said alignment during the process or step of securing said nail bodies together into said stick formation. Once the said stick formation is established, in true and straight form, the extended portions of the elongated heads are readily removed by the last above mentioned step. With the removal of said extended head portions the nail body X takes on the substantially normal configuration of a finish-nail.

Having described only the typical preferred form and application of my invention, I do not wish to be limited or restricted to the specific details herein set forth, but wish to reserve to myself any variations or modifications that may appear to those skilled in the art and fall within the scope of the following claims.

Having described my invention I claim:

1. The method of making a stick comprising a plurality of finish-nails with slightly enlarged heads and including, initially forming a nail body having an elongate cylindrical shank pointed at its terminal end and with a straight sided transversely disposed head of substantial extent at its other end and with flat parallel sides substantially tangent to the shank, arranging the nail bodies with the sides of the extended heads engaged one with the other, securing said bodies together to form a straight stick, and then removing both opposite end portions of each head by severance in planes offset beyond the diameter of the shank in order to reduce the heads in size.

2. The method of making a stick comprising a plurality of finish-nails with slightly enlarged heads and including, initially forming a nail body having an elongate cylindrical shank pointed at its terminal end and with a straight sided transversely disposed head at its other end, said head being of rectangular solid configuration with flat parallel sides substantially tangent to the shank and with opposite end portions extending substantially beyond the shank diameter, arranging the nail bodies with the straight sides of the heads engaged one with the other, securing said bodies together to form a straight stick, and then removing both opposite end portions of each head by severance in spaced planes offset beyond the diameter of the shank in order to reduce them in size.

3. The method of making a stick comprising a plurality of finish-nails with slightly enlarged heads and including, initially forming a nail body having an elongate cylindrical shank pointed at its terminal end and with a straight sided transversely disposed head at its other end, said head being of rectangular solid configuration with flat parallel sides tangent to the shank periphery and with opposite end portions extending substantially beyond the shank diameter, arranging the nail bodies with the flat parallel sides of the heads engaged one with the other, securing said bodies together to form a straight stick, and then simultaneously shearing off both opposite end portions of each head in spaced parallel planes offset beyond the diameter of the shank in order to reduce the heads in size.

References Cited in the file of this patent
UNITED STATES PATENTS

| | | |
|---|---|---|
| 328,889 | Huntington | Oct. 20, 1885 |
| 1,989,769 | Obstfeld | Feb. 5, 1935 |
| 2,125,211 | Vogel | July 26, 1938 |
| 2,137,538 | McIntosh | Nov. 22, 1938 |
| 2,294,463 | Krantz | Sept. 1, 1942 |
| 2,428,259 | Anstett | Sept. 30, 1947 |
| 2,468,821 | Goodstein | May 3, 1949 |
| 2,864,276 | Parker | Dec. 16, 1958 |
| 2,875,664 | Crooks | Mar. 3, 1959 |
| 2,940,081 | Juilfs | June 14, 1960 |